United States Patent

Scherer et al.

[11] Patent Number: 5,884,865
[45] Date of Patent: Mar. 23, 1999

[54] NON-FOGGING AIRCRAFT WINDOW ARRANGEMENT

[75] Inventors: Thomas Scherer, Hamburg; Rainer Mueller, Rosengarten; Sven Uhlemann, Uetersen, all of Germany

[73] Assignee: Daimler-Benz Aerospace Airbus GmbH, Hamburg, Germany

[21] Appl. No.: 984,605

[22] Filed: Dec. 3, 1997

[30] Foreign Application Priority Data

Dec. 5, 1996 [DE] Germany .................. 196 50 417.1

[51] Int. Cl.⁶ ............................................. R64C 1/14
[52] U.S. Cl. ................. 244/129.3; 52/171.2; 52/209; 454/198
[58] Field of Search ........................ 244/129.3, 1 R, 244/118.5; 52/171.2, 171.3, 397, 209; 454/85, 93, 95, 121, 122, 198

[56] References Cited

U.S. PATENT DOCUMENTS

| | | | |
|---|---|---|---|
| 516,245 | 3/1894 | Tinker | 52/171.2 |
| 932,190 | 8/1909 | Throne | 454/198 |
| 2,030,258 | 2/1936 | Knecht | 244/129.3 |
| 2,189,388 | 2/1940 | Zand . | |
| 2,302,740 | 11/1942 | Boicey . | |
| 2,332,060 | 10/1943 | Colleran | 244/129.3 |
| 3,452,553 | 7/1969 | Dershin et al. . | |
| 4,112,645 | 9/1978 | Greenfield | 52/209 |
| 4,932,608 | 6/1990 | Heidish et al. | 244/129.3 |

FOREIGN PATENT DOCUMENTS

| | | |
|---|---|---|
| 0 322776 | 7/1989 | European Pat. Off. . |
| 23321 | 6/1962 | German Dem. Rep. . |
| 693159 | 6/1940 | Germany . |
| 737294 | 6/1943 | Germany . |
| 933371 | 8/1955 | Germany . |
| 1 252533 | 10/1967 | Germany . |

*Primary Examiner*—Galen L. Barefoot
*Attorney, Agent, or Firm*—W. F. Fasse; W. G. Fasse

[57] ABSTRACT

A double-pane aircraft cabin window arrangement avoids fogging, frosting, or icing of the window without using any active pressure regulating system or other active components. An inner pane and an outer pane are held in a window seal that is mounted in a frame connected to the aircraft fuselage. An interspace is formed between the two panes and sealed by the window seal. A condensation inducing tube is connected by a hose to an adapter tube, which passes through the window seal into the window interspace. The condensation inducing tube is connected in a direct thermally conducting manner to the outer fuselage skin of the aircraft. An open end of the condensation inducing tube is arranged to receive pressurized air from the aircraft cabin interior. As the air flows through the condensation inducing tube, any condensable moisture in the air condenses out on the interior walls of the tube, so that only dry air flows into the window interspace.

20 Claims, 2 Drawing Sheets

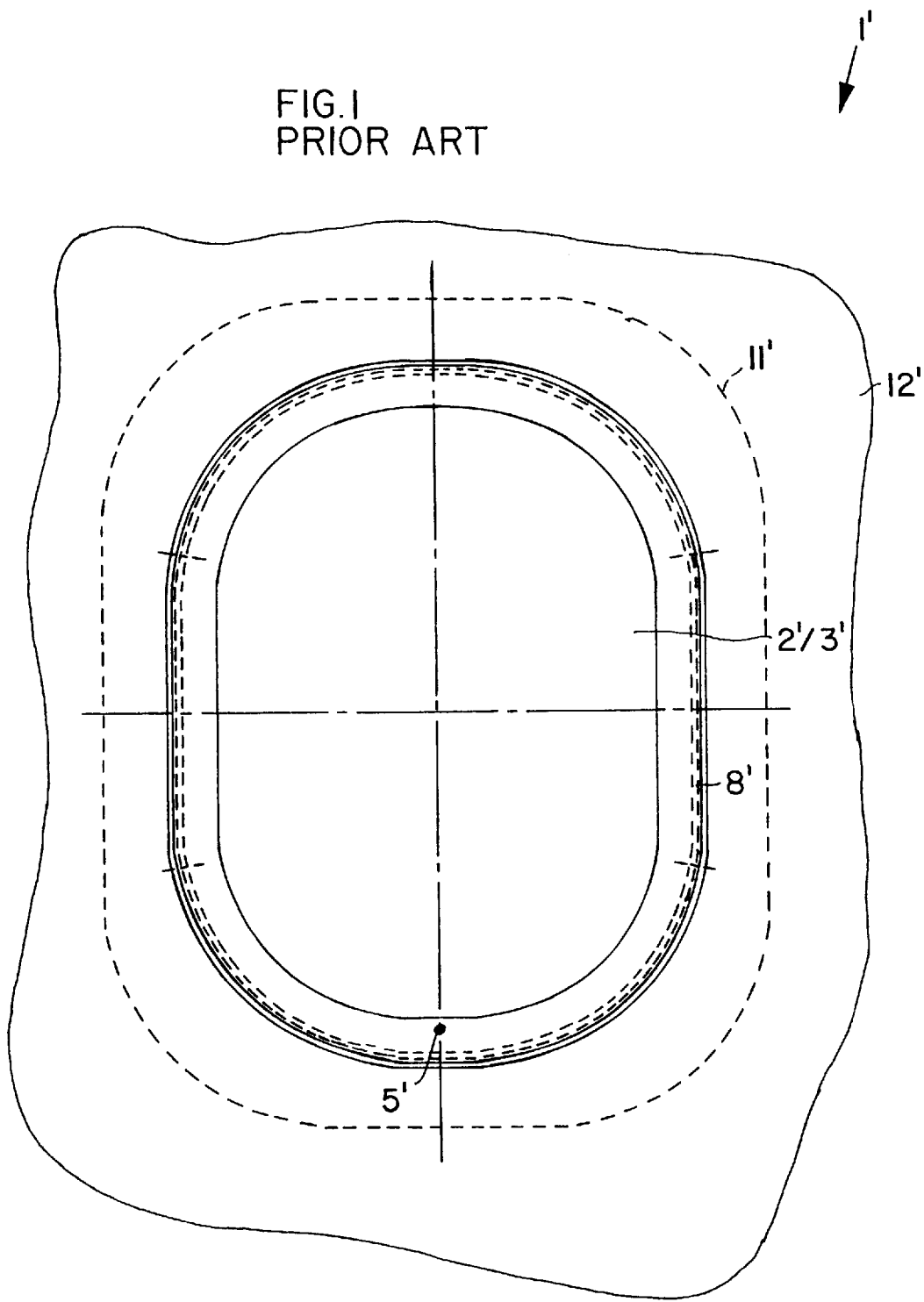

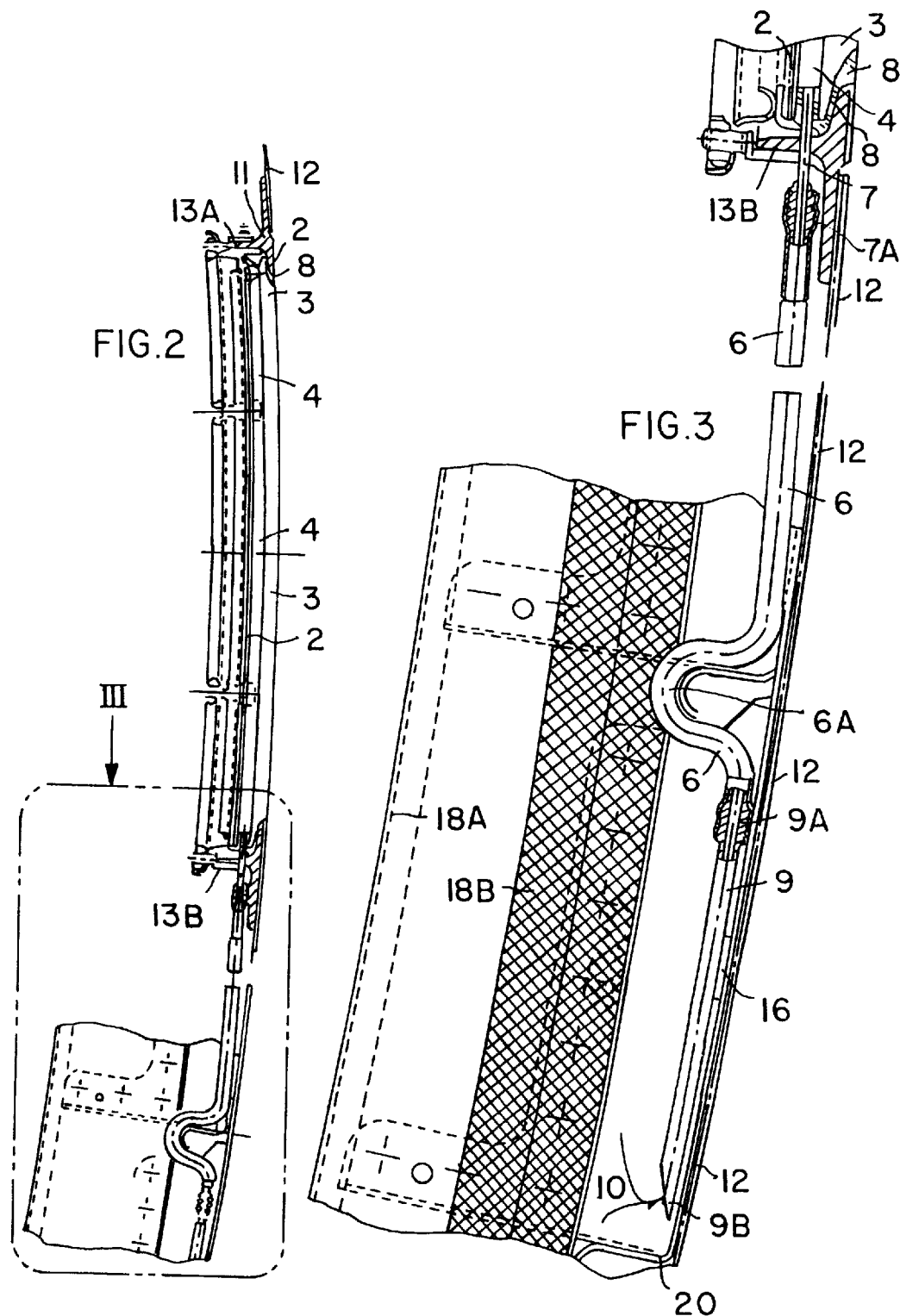

NON-FOGGING AIRCRAFT WINDOW ARRANGEMENT

PRIORITY CLAIM

This application is based on and claims the priority under 35 U.S.C. §119 of German Patent Application 196 50 417.1, filed on Dec. 5, 1996. The entire disclosure of German Patent Application 196 50 417.1 is incorporated herein by reference.

FIELD OF THE INVENTION

The invention relates to a window arrangement, and particularly a cabin window arrangement for an aircraft having two window panes with a ventilated interspace therebetween.

BACKGROUND INFORMATION

Cabin windows that are conventionally used in modern pressurized passenger aircraft typically have a double-pane construction including two window panes spaced apart from one another with a hollow interspace therebetween, whereby the double panes sometimes are intended to provide fail-safe redundancy.

FIG. 1 schematically represents a conventional double-pane cabin window 1' comprising an inner window pane 2' and an outer window pane 3' which are spaced apart from one another and held around their outer perimeter edges in a window seal 8' mounted in a window frame 11' provided on the outer fuselage skin 12' of the aircraft. A hollow interspace is formed between the two panes 2' and 3'. In order to achieve a pressure equalization in this window interspace during flight, and especially during the climb and descent phases of the flight, a ventilation hole 5' is provided at or near the bottom of the inner window pane 2'. This ventilation hole 5' provides an opening from the pressurized passenger cabin into the window interspace. Thus, as a result of any pressure difference between the pressurized cabin interior and the window interspace, an airflow or air exchange between the cabin interior and the window interspace will take place.

Namely, if the pressure in the cabin is greater than the pressure the window interspace, then air will flow from the cabin into the window interspace and achieve a pressure equalization.

Since the outer window pane 3' generally is subjected to a temperature below −30° C. during flight, even the smallest amount of water vapor present in the cabin air that flows into the window interspace will condense of the inner surface of the outer window pane 3'. Of course, greater condensation will occur as the relative humidity of the interior cabin air increases, which is dependent upon the flight condition of the aircraft, and whereby operation of passenger service galleys, the number of passengers, the duration of the flight, and the location and climatic conditions of the flight, are all factors that play a part in the proportion of water vapor in the cabin air. The water vapor laden cabin air will pass through the ventilation hole 5' and thus pass into the window interspace. Especially in situations when the relative humidity of the air is higher than usual, for example in the event of high occupancy of the passenger aircraft, then it is particularly likely that the inner surface of the outer window pane 3' will become fogged by condensation, which may even form a layer of frost or ice due to the very cold external temperatures during flight. As the aircraft then descends into warmer air strata, the frost or ice layer within the window interspace will melt, forming fog or water droplets on the window panes, and in the extreme situation even causing the accumulation or puddling of condensed water at the bottom of the window interspace.

SUMMARY OF THE INVENTION

In view of the above it is an object of the invention to provide a double pane window construction for an aircraft having an improved interspace ventilation system that does not need or use any active pressure regulation components, yet effectively avoids fogging and frosting of the cabin windows. The invention also aims to achieve further advantages as described herein.

The above objects have been achieved in an aircraft window arrangement according to the invention, comprising a window frame mounted in a window opening in the aircraft fuselage, a window seal mounted on the window frame, and two window panes sealingly held spaced apart from one another in the window seal, so as to enclose a window interspace between the inner pane and the outer pane. The improved window arrangement further includes an air passage extending and opening into the window interspace, and a condensation inducing tube having a first open end arranged and adapted to receive air from the pressurized interior of the fuselage and a second end connected to the air passage leading into the window interspace. The condensation inducing tube is mounted in such a manner that there is a direct thermally conducting connection between the condensation inducing tube and the outer skin of the aircraft fuselage. The condensation inducing tube is preferably made of a material having a high thermal conductivity, and is preferably received or held in a thermally conducting holder or mounting bracket that is directly arranged on the inner side of the metal outer skin of the aircraft.

In the inventive arrangement, pressurized cabin air, which contains water vapor for example, can pass from the cabin into the condensation inducing tube, for example through gaps or holes in the cabin interior panelling, whenever a pressure difference exists between the interior of the fuselage and the window interspace, which arises especially during the climb and descent phases of a flight. Since the condensation inducing tube is thermally conductingly connected with the outer skin of the fuselage, it is subjected to the cold temperatures of the outside environment outside the aircraft. Particularly, the condensation inducing tube is arranged external of the cabin insulation. As a result, when the warm moisture laden cabin air passes into the cold condensation inducing tube, any moisture present in the air condenses or even freezes on the inside of the tube, so that the air exiting from the tube and through the air passage into the window interspace is dry, i.e. free of condensable moisture.

This system is self-regulating in that the condensation conditions, e.g. the temperature, in the condensation inducing tube are the same as or more severe than the condensation conditions that exist within the window interspace under any particular flight operating condition. For example, the temperature of the condensation inducing tube is the same as or colder than the temperature of the inner surface of the outer window pane. As a result, the inventive arrangement requires no active components or control, yet assures that the air passing into the window interspace has already been dried to a sufficient degree so that no further condensation will occur inside the window.

Particularly according to the invention, the air passage opening into the window interspace may be provided by a tube-shaped adapter element that passes through a horizontally or laterally projecting frame member of the window frame and through the window seal member at the bottom of the window. A flexible connector hose provides the connection from the condensation inducing tube to the tube-shaped adapter element. The condensation inducing tube is dimensioned, both in length and diameter, to provide a sufficient flow cross-section and total volume to ensure complete condensation of condensable water vapor out of the air passing through the tube, and to provide an adequate reserve volume of dried air to be supplied into the window interspace during descent of the aircraft into warmer air strata where further condensation would not occur in the tube. The term "tube" as used herein refers to any hollow member, of which the cross-sectional shape may be round (preferably), or square or any other shape.

The present inventive arrangement may be easily retrofitted into existing aircraft having a double-paned window configuration, without disrupting the window pane arrangement itself. The present arrangement effectively prevents fogging, frosting, and icing of the cabin windows, with very simple, passive means, which do not significantly increase the weight, structural complexity, or cost of the aircraft. The present arrangement is also durable and reliable because it does not use any active components that could fail or malfunction. The present arrangement may also be applied to aircraft cockpit windows.

BRIEF DESCRIPTION OF THE DRAWINGS

In order that the invention may be clearly understood, it will now be described, in connection with an example embodiment of the invention with reference to the drawings, wherein:

FIG. 1 shows a conventional double-pane window arrangement in a passenger aircraft, having a ventilation hole near the bottom edge or rim of the inner window pane;

FIG. 2 shows a cross-section through a cabin window arrangement according to the invention; and FIG. 3 is an enlarged cross-sectional view of the detail area III of the window arrangement shown in FIG. 2.

DETAILED DESCRIPTION OF PREFERRED EXAMPLE EMBODIMENTS AND OF THE BEST MODE OF THE INVENTION

The prior art window arrangement 1' shown in FIG. 1 has already been described above. The present inventive arrangement can be added to the conventional window arrangement with only relatively simple additions and modifications, while substantially maintaining the conventional cabin window arrangement 1'. It is simply necessary to plug or otherwise close the existing ventilation hole 5'. of course, when a new aircraft is being built with the present window arrangement, the hole 5' is simply omitted from the beginning. The improvement according to the invention is realized by the addition of simple measures and modifications that will now be described with reference to FIGS. 2 and 3.

FIG. 2 shows a cross-section through the fuselage wall of a passenger aircraft, with the passenger cabin to the left and the exterior environment to the right. Similarly to the prior art arrangement of FIG. 1, the cabin window 1 includes an inner pane 2 and an outer pane 3, which may respectively be made of any known aircraft window materials. The two panes are spaced apart from one another with an interspace 4 therebetween, and are received around their perimeter edges in a window seal 8 mounted in a window frame 11 including integral substantially horizontally or laterally protruding support members 13A and 13B. The frame 11 is connected to, and on the outer side partially covered by, the outer fuselage skin 12. The two window panes 2 and 3 are firmly and tightly held and sealed within the seal 8, so that the interspace 4 is a sealed chamber except for the ventilation air passage that will be described below.

FIG. 3 shows an enlarged sectional view of the detailed portion at the bottom of the window 1 and the cabin wall below the window 1, as indicated by the detail area III in FIG. 2. As shown in FIG. 3, an opening passes through the bottom laterally projecting member 13B, which is an integral component of the window frame 11. This opening continues through the window seal 8 to provide a passage into the window interspace 4. For example, this opening may simply be drilled through the frame member 13B and seal member 8. A tube-shaped adapter element 7 is passed through this opening so as to extend through the laterally projecting frame member 13B and the window seal 8 and provide an air flow passage into the window interspace 4.

The end of the hollow tube-shaped adapter element 7 extending externally from the window frame 11 is connected to a connector hose 6. In this context, the end 7A of the of adapter element 7 may be appropriately configured with ribs or barbs or the like to provide a self-retaining end onto which the hose 6 may be pushed and secured. The opposite end of the hose 6 is pushed and secured onto a similarly configured end 9A of a condensation inducing tube 9, that is held in or secured to a holder or mounting bracket 16, which in turn is arranged directly on the outer metal skin 12 of the aircraft fuselage. The hose 6 is flexible and has an excess length to form a loop or bend 6A between the adapter element 7 and the condensation inducing tube 9, so as to compensate for any variations in distance or to circumvent obstructions during installation.

The condensation inducing tube 9 is made of a material having a high thermal conductivity, for example a metal such as an aluminum alloy or the like. The holder or mounting bracket 16 is also made of a thermally conducting material, preferably a metal, so that the holder 16 provides a direct thermal conduction path and connection between the condensation inducing tube 9 and the metal outer skin 12 of the aircraft. To achieve this, the holder 16 may be soldered, brazed, clipped, or adhesively bonded in a thermally conducting manner to the outer skin 12, and the tube 9 may be clipped, soldered or brazed to the holder. Most simply, the tube 9 may have a snap-fit into the holder 16. Alternatively, the tube 9 may be directly mounted, e.g. soldered, brazed, or bonded, to the outer skin 12.

For convenience, the adapter element 7, the connector hose 6, and the condensation inducing tube 9 are arranged directly beneath each respective cabin window, but it is also possible that a single respective condensation inducing tube 9 may be connected by a manifold tube to several windows adjacent one another. In any event, the bottom open end 9B of the tube 9 is arranged externally of the cabin interior panelling 18A and insulation 18B, preferably in an open space between the insulation 18B and the outer fuselage skin 12. Alternatively, while the tube 9 itself is arranged adjacent and connected to the outer fuselage skin 12, the bottom end of the tube 9 may be extended through the insulation 18B into the vicinity of the cabin interior panelling 18A. In any event, the open tube end 9B is arranged so that moist or humid air 10 from the pressurized passenger cabin can pass into the open tube end 9B, for example after infiltrating through gaps or openings in the passenger cabin interior panelling 18A and the insulation 18B.

Whenever a pressure difference arises with a greater pressure inside the pressurized cabin and a lower pressure in the window interspace 4, especially during pressure compensation while the aircraft is descending, the relatively humid air 10 will be sucked into and through the condensation inducing tube 9 and the connector hose 6. As the humid air 10 passes through the cold condensation inducing tube 9, the moisture from the air condenses onto the interior walls of the tube 9. For this purpose, the tube 9 may either be a simple hollow circular tube, or may have ribs or the like on the inner surface thereof. Since the pressure differences between the cabin and the window interior space 4 are relatively small, and because the pressure compensation is carried out relatively slowly during the descent of the aircraft, the water vapor laden air moves rather slowly through the condensation inducing tube 9 and thus has sufficient time for all of the condensation-prone moisture to condense out of the air onto the inner walls of the tube 9. The length and diameter of the tube are sized appropriately to ensure sufficient or total condensation. Also, the inner diameter of the condensation inducing tube 9 is sufficiently large that an adequate air flow cross-section will remain free and clear even if the condensate freezes to form frost or ice on the interior tube walls. If necessary, the tube 9 may have a serpentine shape or the like to provide the necessary air flow length. For simplicity, a straight tube is preferred and is expected to be generally adequate.

In any event, the tube must be arranged substantially vertically, or have a vertical slope component, to ensure that any condensate drops flow downward out of the tube 9, which especially occurs also when frost or ice formed within the tube 9 melts during the final descent of the aircraft or during ground operations or even maintenance of the aircraft. The drops of condensate dripping from the tube end 9B will, for example, collect in a drip channel 20, from which the water will harmlessly evaporate once the aircraft is in warmer conditions.

In most cases, the external temperature increases during descent of the aircraft until the dewpoint temperature is exceeded, and no further condensation takes place in the tube 9. For the further pressure compensation during the final descent and landing phase of the aircraft, the condensation inducing tube 9 and the connector hose 6 serve as a dry air reservoir, so that the air provided into the window interspace 4 up until the time of landing does not contain any condensable moisture. Once again, the total volume of the tube 9 and hose 6 are dimensioned to provide an adequate dry air reservoir volume, which can be determined dependent upon the pressure conditions, the window interspace volume, the humidity conditions, etc. prevailing for any particular aircraft installation.

Using the improved arrangement according to the invention, a pressure compensation of the window interspace 3 is achieved while reliably avoiding fogging, frosting, and icing within the window, without using any active pressure regulating system, or any other active component, which would be technically complicated and cost intensive. Once installed, the present arrangement requires no operating efforts, and essentially no maintenance and upkeep.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A window arrangement for an aircraft having a fuselage including an outer fuselage skin and having an interior space therein, comprising:
   a window frame arranged bordering a window opening in the fuselage,
   a window seal arranged on said window frame,
   an inner window pane and an outer window pane that are spaced apart from one another with a window interspace therebetween and that are supported by said window frame and sealed around perimeter edges of said panes by said window seal,
   a condensation inducing tube that is connected in a direct thermally conducting manner to the outer fuselage skin and that has a first open end arranged for airflow communication with the interior space of the aircraft and a second end, and
   an airflow passage connected to and communicating said second end of said condensation inducing tube with said window interspace.

2. The window arrangement according to claim 1, wherein said airflow passage comprises an adapter tube passing through said window seal and having a first end opening into said window interspace and a second end protruding outside of said window seal, and a connector hose connected to and interconnecting said second end of said adapter tube and said second end of said condensation inducing tube.

3. The window arrangement according to claim 2, wherein said second end of said adapter tube and said second end of said condensation inducing tube each respectively comprise a hose mounting configuration that receives and securely holds said connector hose thereon.

4. The window arrangement according to claim 2, wherein said connector hose has an excess length between said second end of said adapter tube and said second end of said condensation inducing tube and includes a loop or bend therein.

5. The window arrangement according to claim 1, wherein said window frame comprises a laterally protruding frame member that protrudes inwardly from said fuselage toward the interior space of the aircraft adjacent said perimeter edges of said window panes, and wherein said airflow passage passes through a hole provided through said frame member and through said window seal.

6. The window arrangement according to claim 1, wherein said window a frame is arranged such that an outward facing side of said window frame is at least partially covered by the outer fuselage skin.

7. The window arrangement according to claim 1, wherein said condensation inducing tube and said airflow passage are arranged directly beneath said window panes and said window frame, and wherein said airflow passage opens into said window interspace at a bottom edge thereof.

8. The window arrangement according to claim 1, further comprising a thermally conducting mounting holder that is arranged directly on an inner surface of the outer fuselage skin, and wherein said condensation inducing tube is secured to said mounting holder, whereby said condensation inducing tube is connected in said direct thermally conducting manner to the outer fuselage skin.

9. The window arrangement according to claim 8, wherein said mounting holder and said condensation inducing tube are each made of a material having good thermal conductivity.

10. The window arrangement according to claim 1, wherein said condensation inducing tube is made of a metal.

11. The window arrangement according to claim 1, wherein said condensation inducing tube and said airflow passage together are adapted to ventilate and equalize any pressure difference in said window interspace relative to the interior space of the aircraft by allowing air to flow between the interior space of the aircraft and said window interspace responsive to any pressure difference therebetween.

12. The window arrangement according to claim 1, wherein said condensation inducing tube and said airflow passage together form a constantly open, passive, direct ventilation path between said window interspace and the interior space of the aircraft.

13. The window arrangement according to claim 1, wherein said window interspace is hermetically sealed within and between said window panes and said window seal, except for only said airflow passage communicating into said window interspace.

14. The window arrangement according to claim 1, not including any active or controllable device interposed in airflow communication between said window interspace and the interior space of the aircraft.

15. The window arrangement according to claim 1, wherein only one said window interspace is connected by said airflow passage to each said condensation inducing tube.

16. The window arrangement according to claim 1, wherein said condensation inducing tube is a straight tube member oriented vertically along an inner surface of the outer fuselage skin.

17. The window arrangement according to claim 1, wherein the aircraft a further includes cabin interior paneling and thermal insulation arranged between the cabin interior paneling and the outer fuselage skin, and wherein said condensation inducing tube is arranged entirely externally from the thermal insulation in a space between the thermal insulation and the outer fuselage skin.

18. The window arrangement according to claim 1, further comprising a drip collecting vessel arranged below said first open end of said condensation inducing tube and adapted to catch and collect liquid drops dripping from said first open end of said condensation inducing tube.

19. The window arrangement according to claim 1, wherein said condensation inducing tube has a length and an airflow cross-sectional area that are dimensioned adequately so that all condensable moisture will be condensed out of air flowing through said condensation inducing tube from said first open end to said second end thereof.

20. A method for ventilating an interspace between an inner pane and an outer pane of a double-pane window in a fuselage of an aircraft, comprising the following steps:

a) cooling a tube by thermal conduction therefrom to a cold outer fuselage skin of the fuselage of the aircraft;

b) flowing moisture-containing air from a pressurized interior within the fuselage of the aircraft into said tube;

c) condensing moisture contained in said moisture-containing air onto an interior wall surface of said cooled tube so as to produce dry air; and d) flowing said dry air into said interspace.

* * * * *